Patented June 11, 1935

2,004,370

UNITED STATES PATENT OFFICE 2,004,370

ADHESIVE

Mortimer T. Harvey, East Orange, N. J., assignor to The Harvel Corporation, a corporation of New Jersey No Drawing. Application February 12, 1932, Serial No. 592,649

4 Claims. (Cl. 134—23.1)

The present invention relates generally to products made from cashew nut shell liquid and the present invention relates more particularly to adhesives made from cashew nut shell liquid and gelatinous materials such as animal glues, gelatins and blood and egg albumen.

Some of the gelatinous materials which are useful in the practice of the present invention are raw blood, defibrinated blood, hemoglobin, white blood albumin, egg albumin, casein, skins such as untanned leathers, hide powder, gelatin, and animal glue.

The adhesives of the present invention are made with from about 5% to 90% by weight of the gelatinous material, the balance being cashew nut shell liquid, the gelatinous material being dissolved in water when necessary before being intermixed with the cashew nut shell liquid.

An example of an adhesive of the gelatin and glue class is as follows: five pounds of animal glue were dissolved in seven and a half liters of water and the solution mixed with sixteen pounds of cashew nut shell liquid. Preferably, the water is warmed to take up the glue, and the cashew nut shell liquid is mixed with the glue solution in the warmed condition.

The glue used had the following analysis taken on the glue basis: jelly strength, 245 grams; viscosity, 65 millipoises; and a pH of 6. The cashew nut shell liquid was obtained by heating cashew nuts at about 400° F. under reduced pressure whereby the shell liquid is expelled by the internal pressure exerted by the expansion of the heated liquid. This gives a liquid of much lighter color than commercial cashew nut shell liquid and the adhesive prepared therefrom as above set forth is of a light color. Commercial cashew nut shell liquid can also be used but because of the dark color thereof the adhesive is darker in color. The commercial cashew nut shell liquid now obtainable on the market is secured by charring the shells of the cashew nuts to free the shell liquid, and as a consequence the shell liquid is contaminated by particles of carbon which are so fine that great difficulty is experienced getting rid of them.

What I claim and desire to protect by Letters Patent is:

1. An adhesive of the class of animal glues, gelatines and egg and blood albumins, modified with cashew nut shell liquid, the former comprising about 5% to 90% of the combined weight.

2. An adhesive comprising a water emulsion of material of the class of animal glues and gelatin, and egg and blood albumins, intermixed with cashew nut shell liquid, the material of said class comprising about 5% to 90% of the combined weight of itself and the cashew nut shell liquid.

3. An adhesive material resulting from the mixture of cashew nut shell liquid and gelatin, the latter comprising about twenty-five per cent of the combined weight.

4. An adhesive composition resulting from the mixture of cashew nut shell liquid and gelatin in which the proportions of these ingredients range from about nineteen parts by weight of the former and one part of the latter to about one part of the former and ten parts of the latter.

MORTIMER T. HARVEY.